United States Patent
Kim et al.

(10) Patent No.: US 11,230,492 B2
(45) Date of Patent: Jan. 25, 2022

(54) ANTI-GLARE GLASS AND MANUFACTURING METHOD THEREFOR

(71) Applicant: DNF CO., LTD., Daejeon (KR)

(72) Inventors: Myong Woon Kim, Daejeon (KR); Man Young Park, Daejeon (KR); Hyun Gwan Kim, Sejong-si (KR); Ki Hoon Song, Cheongju-si (KR); Jae Won Oh, Daejeon (KR)

(73) Assignee: DNF CO., LTD., Daejeon (KR)

( * ) Notice: Subject to any disclaimer, the term of this patent is extended or adjusted under 35 U.S.C. 154(b) by 101 days.

(21) Appl. No.: 16/096,950

(22) PCT Filed: Apr. 28, 2016

(86) PCT No.: PCT/KR2016/004460
§ 371 (c)(1),
(2) Date: Nov. 30, 2018

(87) PCT Pub. No.: WO2017/188477
PCT Pub. Date: Nov. 2, 2017

(65) Prior Publication Data
US 2019/0119151 A1    Apr. 25, 2019

(51) Int. Cl.
*C03C 17/30* (2006.01)
*B05D 5/02* (2006.01)

(52) U.S. Cl.
CPC .............. *C03C 17/30* (2013.01); *B05D 5/02* (2013.01); *C03C 2217/732* (2013.01); *C03C 2217/77* (2013.01); *C03C 2217/78* (2013.01); *C03C 2218/112* (2013.01); *C03C 2218/32* (2013.01)

(58) Field of Classification Search
None
See application file for complete search history.

(56) References Cited

U.S. PATENT DOCUMENTS

| 8,563,129 B2 * | 10/2013 | Rode | H01L 31/02168 428/336 |
| 2002/0119675 A1 * | 8/2002 | Goo | H01L 21/02126 438/778 |

(Continued)

FOREIGN PATENT DOCUMENTS

| CN | 101246224 A | 8/2008 |
| CN | 104877290 A | 9/2015 |

(Continued)

OTHER PUBLICATIONS

Patel et al., Surface Haze and Surface Morphology of Blown Film Compositions, Journal of Plastic Film & Sheeting, vol. 12—Jul. 2005.*

(Continued)

*Primary Examiner* — James M Mellott
(74) *Attorney, Agent, or Firm* — McCoy Russell LLP

(57) ABSTRACT

An anti-glare glass of the present disclosure has excellent anti-glare properties and visibility by forming glass in which polysilazane-derived surface unevenness are applied to a glass surface without mixing a heterogeneous element, and has remarkably improved wear resistance and durability since the polysilazane is changed for glass on the glass surface by thermal treatment.

7 Claims, 1 Drawing Sheet

(56) References Cited

U.S. PATENT DOCUMENTS

| | | | | |
|---|---|---|---|---|
| 2014/0272127 A1* | 9/2014 | Kalyankar | ............. | G02B 1/113 |
| | | | | 427/162 |
| 2015/0249166 A1 | 9/2015 | Iitsuka et al. | | |
| 2016/0190357 A1* | 6/2016 | Kawashima | ......... | C09D 183/16 |
| | | | | 136/256 |
| 2016/0363698 A1* | 12/2016 | Fan | ..................... | C09D 183/04 |

FOREIGN PATENT DOCUMENTS

| | | |
|---|---|---|
| JP | 2013043812 A | 3/2013 |
| KR | 1020110060233 A | 6/2011 |
| KR | 101137206 B1 | 4/2012 |
| KR | 1020150098443 A | 8/2015 |
| KR | 1020160061669 A | 6/2016 |
| WO | 2016001661 A2 | 1/2016 |

OTHER PUBLICATIONS

ISA Korean Intellectual Property Office, International Search Report Issued in Application No. PCT/KR2016/004460, dated Jan. 26, 2017, WIPO, 4 pages.

Japanese Patent Office, Office Action Issued in Application No. 2018-556462, dated Dec. 11, 2019, 7 pages.

\* cited by examiner

ANTI-GLARE GLASS AND MANUFACTURING METHOD THEREFOR

CROSS-REFERENCE TO RELATED APPLICATIONS

The present application is a U.S. National Phase of International Patent Application Serial No. PCT/KR2016/004460 entitled "ANTI-GLARE GLASS AND MANUFACTURING METHOD THEREFOR," filed on Apr. 28, 2016. The entire contents of the above-cited application are hereby incorporated by reference in their entirety for all purposes.

TECHNICAL FIELD

The present disclosure relates to an anti-glare glass with enhanced anti-glare and visibility.

BACKGROUND ART

When a display is exposed to external light such as natural light or lighting light, contrast is degraded while light incident on a display surface is reflected and visibility is degraded due to image reflection. In addition, a user glares due to a monitor and has difficulty in recognizing characteristics and, thus, eye fatigue easily increases or headache is caused.

A method of preventing this includes anti-glare technology for preventing external light from being reflected off a display surface such as a glass or a film, including a display. According to the anti-glare technology, a mixture obtained by an organic/inorganic minute particle and binder resin or curable resin is coated on a basic material to form unevenness on a surface thereof, thereby preventing external light from being reflected.

Haze is a reference of anti-glare and is generally represented by % and, in this regard, as haze increases, diffused reflection of light increases and anti-glare increases. The anti-glare refers to a glare degree due to reflection of external light.

Light transmittance refers to a ratio of intensity of light transmitted through a material layer or a boundary surface to intensity of incident light and is generally represented by %.

Korean Patent No. 10-1137206 discloses a method of manufacturing anti-glare glass, including a cut and process operation of processing a material to a desired shape, forming unevenness via sanding, and cutting the resultant to increase transmittance.

In addition, Korean Patent Publication No. 10-2011-0060233 discloses a method of manufacturing anti-glare glass, including forming a ceramic coating layer with a uniform thickness on a glass substrate, peeling the ceramic coating layer from the glass substrate using a first etching solution to form first roughness on a surface of the glass substrate and, then, etching the surface of the glass substrate via a second etching solution to form second roughness on the surface of the glass substrate.

When the size or frequency of the unevenness is increased to increase anti-glare, there is a problem in that an image oppositely turns white due to reflection of external light or a degree of definition is degraded due to an excessive increase in haze to degrade visibility. When the size or frequency of the unevenness is increased, light is diffusely reflected to prevent glare, but there is a problem in that it is difficult to adjust the size or frequency of the unevenness.

On the other hand, when haze of a surface is reduced, a degree by which an image turns white due to reflection of external light is prevented to some degree, but light is strongly reflected off a surface of a basic material. To prevent this, there is a method of increasing haze in an anti-glare layer, but there is a problem in that transmittance is rather degraded due to internal haze due to a difference in reflective index between a minute particle and resin.

Another method of increasing anti-glare includes a method of increasing a surface area for attachment of a water-repellent agent to a surface of a basic material via dry etching or wet etching to form a coating layer on a glass surface using an inorganic minute particle, e.g., $Al_2O_3$, $Y_2O_3$, $ZrO_2$, AlC, TiN, AlN, TiC, MgO, CaO, $CeO_2$, $TiO_2$, $SiO_2$, SiC, and $AlF_3$. However, this method has a problem in that a burden to expensive equipment is high in the case of dry etching such as plasma treatment and a burden to a separate clean process, processing costs of products, and so on is high during a process of immersing a substrate in a strong alkali cleaning agent or dilute acid in the case of dry etching.

Another method of increasing anti-glare includes a method of attaching an anti-glare film for refracting light on a glass surface. However, the film is formed by alternately attaching a high-refractive film and a low-refractive film and, thus, manufacturing costs are increased.

DISCLOSURE

Technical Problem

An object of the present disclosure is to provide an anti-glare glass and a method of manufacturing the same, for overcoming problems in that an image turns white due to reflection of external light and a degree of definition is degraded due to an excessive increase in haze which degrades visibility, and problems in terms of low anti-glare and high manufacturing costs to achieve excellent anti-glare and visibility.

Another object of the present disclosure is to provide an anti-glare glass and a method of manufacturing the same, for enhanced control accuracy of anti-glare and visibility.

Another object of the present disclosure is to provide an anti-glare glass with excellent abrasion-resistance characteristics and durability and a method of manufacturing the same.

Technical Solution

A method of minimizing glare includes a method of enhancing anti-glare by increasing haze, e.g., by guiding diffused reflection of light. The method is advantageous of minimizing glare, but has a problem in terms of degraded light transmittance and reduced visibility. Accordingly, transmittance needs to be maximized while having an appropriate haze value.

However, as described above, generally, haze and transmittance have a tendency of being inversely proportional to each other and, thus, it is most important to maximize transmittance while having appropriate haze for preventing diffused reflection.

That is, an effect of preventing glass is enhanced along with an increase in haze and visibility is reduced along with a reduction in transmittance and, thus, the present disclosure provides an anti-glare glass with high transmittance while having both high haze and transmittance.

The "glass" stated in the specification refers to any glass, a polymer, and a basic material, which are generally used in a display, and may also refer to any basic material for transmitting light therethrough in such a way that light incident on a rear surface of the basic material is transmitted through the basic material to be identified.

In one general aspect, an anti-glare glass prepared by spraying, coating, and stacking a coating composition includes 1 to 40 wt. % of polysilazane, represented by Chemical Formula 1 below and having a weight average molecular weight equal to or less than 30,000, and having haze of 1 to 5% and transmittance equal to or greater than 90%.

In one general aspect, the polysilazane may be represented by Chemical Formula 1 below.

[Chemical Formula 1]

($R_1$, $R_2$, and $R_3$ each independently include any one or two or more selected from hydrogen, an alkyl group, an alkenyl group, a cycloalkyl group, an aryl group, a group with a carbon group bonded directly to silicon, an alkylsilyl group, an alkylamino group, and an alkoxy group and n is an integer.)

The polysilazane may be inorganic polysilazane or organic polysilazane having a repeating unit of Chemical Formula 1 above. The inorganic polysilazane may not include a group with $R_1$, $R_2$, and $R_3$, all of which include carbon and, in detail, may be inorganic polysilazane with $R_1$, $R_2$, and $R_3$, all of which are hydrogen. At least one selected from $R_1$, $R_2$, and $R_3$ of the organic polysilazane includes any one or two or more selected from an alkyl group, an alkenyl group, a cycloalkyl group, an aryl group, a group with a carbon group bonded directly to silicon, an alkylsilyl group, an alkylamino group, an alkoxy group, and the like. In addition, n is not largely limited as long as n is an integer in such a way that a weight average molecular weight of polysilazane having a repeating unit of Chemical Formula 1 satisfies 30,000 or less.

The inorganic polysilazane and the organic polysilazane may be soluble in a solvent and may be prepared using an arbitrary method including a conventional known method. In detail, a method of preparing the inorganic polysilazane may include a method of synthesizing organic polysilazane by mixing pyridine and dihalosilane, in detail, substituted silane with Cl to form a silane adduct and, then, mixing the corresponding adduct of silane and ammonia, and removing ammonium salt.

When a weight average molecular weight of the polysilazane is greater than 30,000, curing may be promoted even via exposure to air, surface roughness of a coating layer may become serious, haze may be increased, and transmittance may be remarkably reduced. In addition, it is difficult to adjust and control the weight average molecular weight of the polysilazane and, thus, reproducibility of required anti-glare and transmittance may be degraded.

In one general aspect, an anti-glare glass may have excellent abrasion-resistance characteristics and durability along with anti-glare by coating a coating composition including polysilazane and a solvent on a glass surface using a spray method and, then, performing heat treatment. The spray method may have remarkably enhanced transmittance while appropriately maintaining a range of haze when various conditions such as content, viscosity, and spray quantity of polysilazane, intensity of layers that are stacked via spray, spray time, and a sintering time after spray are applied together.

In one general aspect, when a coating composition including polysilazane and a solvent is sprayed onto a glass surface and the solvent is removed within 90 seconds, in detail, within 60 seconds, transmittance may be remarkably enhanced while maintaining an appropriate haze value. In detail, a layer formed by applying unevenness on a glass surface is formed simply using polysilazane without mixing of a heterogeneous atom and, thus, transmittance may be remarkably enhanced compared with the case in which unevenness is formed via mixing of a heterogeneous atom.

In one general aspect, the temperature and time when the solvent is removed may be in the range of 50 to 100° C. and the range of 1 to 5 minutes. When the dry temperature and dry time in the range are satisfied, transmittance may be increased compared with haze.

In one general aspect, when a coating composition including polysilazane and a solvent is sprayed onto a glass surface, the solvent is removed within 60 seconds and, then, heat treatment is performed, a coating composition layer including polysilazane is modified to glass with unevenness equal to or greater than glass hardness and, thus, both excellent haze and transmittance may be achieved and abrasion-resistance characteristics and durability may also be remarkably enhanced.

In this case, the heat treatment may include heat treatment at a temperature of 400 to 700° C. and, in detail, may include primary heat treatment at a temperature of 50 to 200° C. and secondary heat treatment at a temperature of 400 to 700° C., in detail, 450 to 700° C. Heat treatment may be performed at a temperature equal to or greater than 400° C. to modify a polysilazane layer to a glass layer with glass hardness or greater and, thus, the anti-glare glass may have the excellent haze and transmittance. In particular, primary heat treatment and secondary heat treatment may be sequentially performed and, thus, abrasion-resistance characteristics and durability may be more stably enhanced.

The coating composition may include 1 to 40 wt. % of polysilazane and 60 to 99 wt. % of a solvent based on a total weight, in detail, 2 to 25 wt. % of polysilazane and 75 to 98 wt. % of a solvent, in more detail, 2 to 20 wt. % of polysilazane and 80 to 98 wt. % of a solvent. When the polysilazane includes inorganic polysilazane and organic polysilazane, the polysilazane may include 1 to 40 parts by weight of organic polysilazane based on 100 parts by weight of inorganic polysilazane, in detail, 5 to 30 parts by weight of organic polysilazane. When the polysilazane includes both inorganic polysilazane and organic polysilazane, it may be more easily control haze and visibility.

The solvent may be any solvent in which polysilazane is soluble and, for example, may include any one or two or more selected from aromatic hydrocarbon, aliphatic hydrocarbon, halogenated hydrocarbon, ester, ketone, ether, alcohol, and so on. The aromatic hydrocarbon may include, for example, benzene, toluene, ethylbenzene, chlorobenzene, o-xylene, m-xylene, p-xylene, styrene, isopropylbenzene, n-propylbenzene, chlorotoluene, butylbenzene, dichlorobenzene, diisopropylbenzene, nitrotoluene, and so on. The aliphatic hydrocarbon may include, for example, pentane, hexane, octane, nonane, decane, decaline, undecane, dodecane, tridecane, tetradecane, isononane, isodecane, isoundecane, isododecane, isotridecane, isotetradecane, cyclononane, cyclodecane, cycloundecane, cyclododecane, cyclotridecane, cyclotetradecane, and the like. Halogenated hydrocarbon may include, for example, chloroform, dichloromethane, and the like. Ester may include, for example, benzylacetate, allylhexanoate, butylbutyrate, ethylacetate, ethylbutyrate, ethylhexanoate, ethylsinanoate, ethylheptanoate, ethylnonanoate, ethylpentanoate, isobutylacetate, isobutylformate, isoamylacetate, isopropylacetate, methylphenylacetate, and the like. Ketone may include, for example, acetone, methylethylketone, methylisobutylketone, and so on. Ether may include, for example, diethylether, dimethoxyethane, dimethoxymethane, dioxane, tetrahydrofuran, anisole, crown ether, polyethylene glycol, and the like. Alcohol may include, for example, alcohol with three carbons or greater and halogenated alcohol with three carbons or greater, such as isopropylalcohol, n-butanol, isobutanol, sec-butanol, n-heptanol, n-octanol, n-nonanol, n-decanol, n-tetradecanol, eicosanol, heptadecaphlorodecanol, hexadecaphlorononanol, dodecaphloroheptanol, and the like.

The coating composition may have viscosity of 0.5 to 2.0 cp. The viscosity may be adjusted depending on a weight average molecular weight and content of polysilazane and, in detail, may be 0.8 to 1.7 cp.

The anti-glare glass according to the present disclosure may have haze in the range of 1 to 5%, in detail, 1 to 3% and may have transmittance in the range equal to or greater than 90%, in detail, 91% or greater. When the range is not satisfied, an anti-glare effect may be slight and transmittance may be remarkably degraded while the anti-glare effect is not largely increased and, thus, visibility may be remarkably reduced.

The anti-glare glass according to the present disclosure may be prepared by staking, with 5 to 15 $g/m^2$, in detail, 7 to 13 $g/m^2$, a coating layer formed by forming the coating composition on a glass surface. When weight per unit area is greater than 15 $g/m^2$, haze may be more increased, but transmittance may be remarkably reduced and, when the weight per unit area is less than 5 $g/m^2$, haze may be very low and, thus, sufficient anti-glare may not be achieved.

As described above, the anti-glare glass according to the present disclosure may include a layer with unevenness formed simply using polysilazane and the layer may have surface roughness in the range of 1 to 20 nm. The surface roughness refers to the roughness of a surface and refers to a degree of minute unevenness formed on the surface. When surface roughness is less than 1 nm, it may be difficult to substantially achieve an anti-glare effect and, when surface roughness is greater than 20 nm, light transmittance may be lowered and visibility may be remarkably degraded.

A method of manufacturing an anti-glare glass according to the present disclosure may include S1) preparing a coating composition, S2) spraying and coating the coating composition onto a glass surface using a spray method, S3) removing a solvent, and S4) performing heat treatment.

In one general aspect, S3) may include removing a solvent within 90 seconds, in detail, within 60 seconds after the coating composition is coated in S2). When a solvent is removed or is not removed after 90 seconds when the coating composition is coated, transmittance and haze may be remarkably reduced due to dry or curing at room temperature and, then, even if heat treatment is further performed, increase in abrasion-resistance characteristics and durability may be slight.

In one general aspect, S3) may include performing drying at a temperature in the range of 50 to 100° C. for 1 to 5 minutes to remove a solvent. The dry method may be any well-known method and may include, for example, hot air drying.

In one general aspect, S3) may include performing primary heat treatment at a temperature of 50 to 200° C. for 2 to 10 minutes and, then, performing secondary treatment at a temperature of 400 to 700° C. for 30 to 90 minutes.

Advantageous Effects

An anti-glare glass according to the present disclosure may have excellent anti-glare and visibility by forming a glass with surface unevenness formed of polysilazane on a glass surface without mixing of a heterogeneous atom.

The anti-glare glass according to the present disclosure may have remarkably enhanced abrasion-resistance characteristics and durability by modifying polysilazane formed on the glass surface to glass via heat treatment.

The anti-glare glass according to the present disclosure may have transmittance equal to or greater than 90% and haze in the range of 1 to 5% and, thus, may have excellent visibility and excellent anti-glare.

BEST MODE

Figure 1:
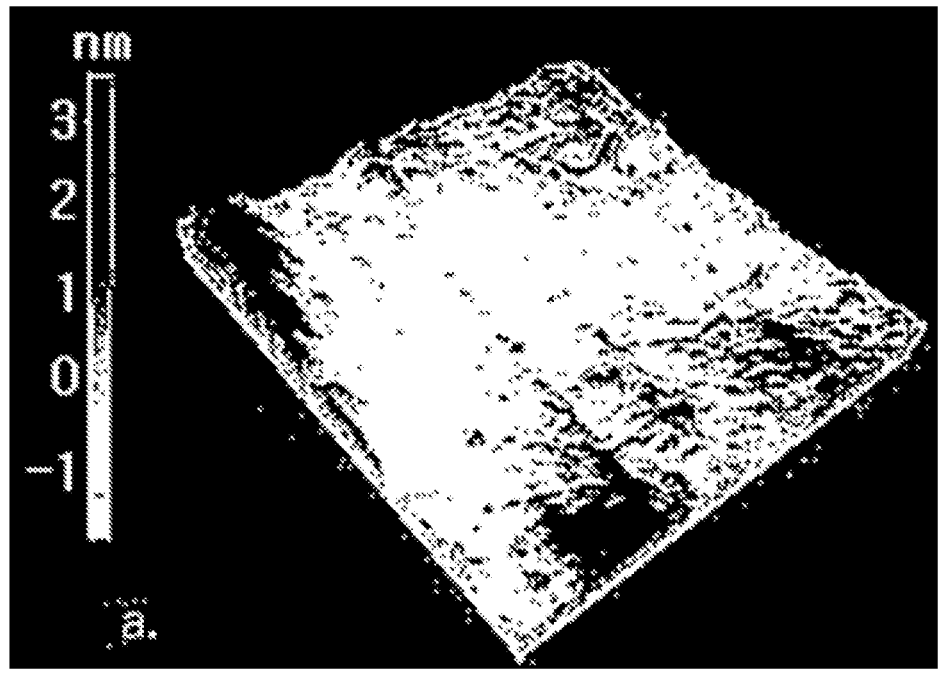
FIG. 1 is a graph showing surface roughness of a coating surface.
Figure 2:
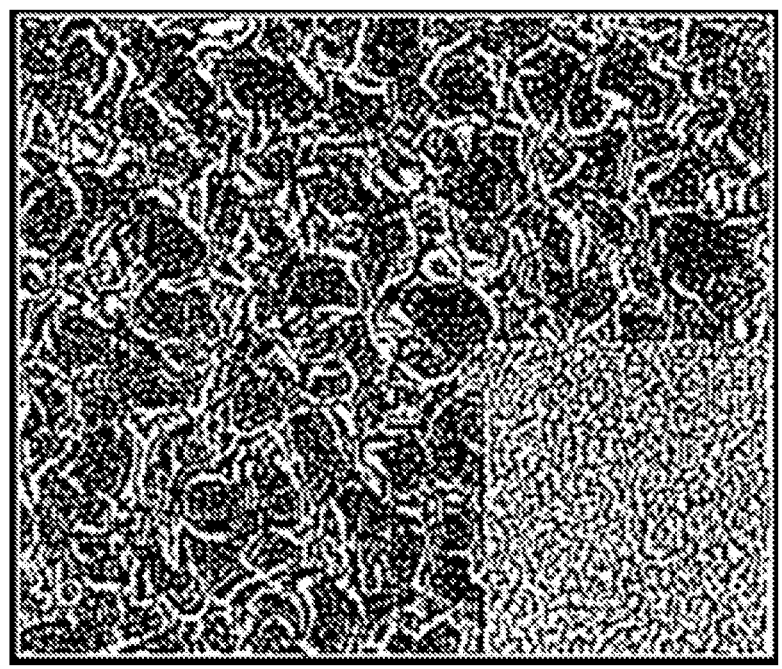
FIG. 2 is an electron microscopic image.

Hereinafter, an anti-glare glass and a method of manufacturing the same will be described with regard to exemplary embodiments of the invention with reference to the attached drawings.

Unless otherwise defined, all terms (including technical and scientific terms) used herein have the same meaning as commonly understood by one of ordinary skill in the art to which this inventive concept belongs. In the following description of the present disclosure, a detailed description of known functions and configurations incorporated herein will be omitted when it may make the subject matter of the present disclosure unclear.

Hereinafter, embodiments of the present disclosure will be described in detail with reference to the following examples. However, these examples are not intended to limit the purpose and scope of the embodiments of the present disclosure.

Inventive Example 1

50 g of inorganic polysilazane with a weight average molecular weight of 15,000 and 950 g of an ortho-Xylene (available from SK Chemicals) solvent were put in a reactor and were mixed and stirred in 10 minutes to prepare a coating composition. The coating composition was coated onto a glass plate with a size of 50 cm×50 cm using a spray gun (spray pressure of 20 psi and a spray quantity of 10 $g/m^2$) and, then, was dried within 60 seconds for 2 minutes under a hot blast condition of 80° C. to remove the solvent. Then, primary heat treatment using a heat curing method was performed on the resultant at a temperature of 150° C. for 5 minutes and secondary heat treatment using a heat curing method was performed on the resultant at a temperature of 450° C. for 60 minutes to prepare an anti-glare glass.

Inventive Example 2

An anti-glare glass was prepared in the same manner as in Inventive Example 1 except that 70 g of inorganic polysilazane and 930 g of a solvent were used instead of 50 g of the inorganic polysilazane and 950 g of the solvent.

Inventive Example 3

An anti-glare glass was prepared in the same manner as in Inventive Example 1 except that 90 g of inorganic polysilazane and 910 g of a solvent were used instead of 50 g of the inorganic polysilazane and 950 g of the solvent.

Inventive Example 4

An anti-glare glass was prepared in the same manner as in Inventive Example 1 except that 120 g of inorganic polysilazane and 880 g of a solvent were used instead of 50 g of the inorganic polysilazane and 950 g of the solvent.

Inventive Example 5

An anti-glare glass was prepared in the same manner as in Inventive Example 1 except that 180 g of inorganic polysilazane and 820 g of a solvent were used instead of 50 g of the inorganic polysilazane and 950 g of the solvent.

Inventive Example 6

An anti-glare glass was prepared in the same manner as in Inventive Example 1 except that 940 g of a solvent was used instead of 940 g of a solvent and 10 g of organic polysilazane with a weight average molecular weight of 2,000 was further put into a reactor.

Inventive Example 7

An anti-glare glass was prepared in the same manner as in Inventive Example 1 except that the coating composition was dried after 100 seconds to remove a solvent instead of drying the coating composition within 60 seconds to remove a solvent.

Comparative Example 1

An anti-glare glass was prepared in the same manner as in Inventive Example 1 except that 9 g of inorganic polysilazane and 991 g of a solvent were used instead of 50 g of the inorganic polysilazane and 950 g of the solvent.

Comparative Example 2

An anti-glare glass was prepared in the same manner as in Inventive Example 1 except that a coating composition was coated for 5 seconds at speed of 2 g/seconds via flow coating instead of coating the coating composition using the spray gun.

Comparative Example 3

An anti-glare glass was prepared in the same manner as in Inventive Example 1 except that inorganic polysilazane with a weight average molecular weight of 40,000 was used instead of inorganic polysilazane with a weight average molecular weight of 15,000.

Test and Measurement Method

1. Transmittance

Transmittance of an area of 500 nm was measured using UVV is spectrophotometer (SCINCO, S3100).

2. Haze (Anti-glare)

Haze was measured using a haze meter (HM150 available from Murakami Color Technology Laboratory).

3. Viscosity

Viscosity was measured using a viscometer (VL700 available from Hydramotion).

4. Hardness

The hardness of a pencil was measured using MITSUBISHI PENCIL.

Measurement Result

TABLE 1

| | Content of polysilazane (%) | Haze (%) | Transmittance (%) | coating composition viscosity (cp) | Thickness (nm) | hardness |
|---|---|---|---|---|---|---|
| Inventive Example 1 | 5 | 2.04 | 91.8 | 1.12 | 210 | 9H |
| Inventive Example 2 | 7 | 2.19 | 91.7 | 1.17 | 246 | 9H |
| Inventive Example 3 | 9 | 2.52 | 91.2 | 1.29 | 271 | 9H |
| Inventive Example 4 | 12 | 2.65 | 90.9 | 1.36 | 298 | 9H |
| Inventive Example 5 | 18 | 2.85 | 90.3 | 1.49 | 335 | 9H |
| Inventive Example 6 | 6 | 2.85 | 92.3 | 1.15 | 335 | 9H |
| Comparative Example 1 | 0.9 | 0.18 | 92.8 | 1.01 | 94 | 9H |
| Comparative Example 2 | 5 | 0.21 | 93.9 | 1.12 | 987 | 9H |
| Comparative Example 3 | 5 | 9.34 | 86.4 | 1.56 | 753 | 9H |

Comparing Inventive Examples 1 through 5, as content of inorganic polysilazane increases, transmittance had a tendency of being reduced and haze had a tendency of being increased.

The anti-glare glass prepared by coating the coating compositions according to Inventive Examples 1 through 6 had excellent anti-glare characteristics with haze less than 5% and transmittance of 90% or greater. It was seen that the anti-glare glass prepared by coating the coating composition according to Inventive Example 6 further included organic polysilazane to have more enhanced transmittance while having appropriate haze.

On the other hand, it was seen that the anti-glare glass according to Comparative Example 1 was prepared using inorganic polysilazane, the content of which is lowered to 0.9% and, in this case, haze was remarkably lowered and anti-glare disappeared.

On the other hand, the anti-glare glass according to Comparative Example 2 was prepared of a coating composition using a flow coating method, which was a general transparent glass with haze of 0.21% and without surface roughness and has no anti-glare characteristics.

It was seen that the anti-glare glass according to Comparative Example 3 was prepared of inorganic polysilazane with a weight average molecular weight of 30,000 or greater and, here, curing was promoted even via exposure to air, surface roughness of a coating layer become serious, haze was increased, and transmittance was remarkably reduced. Accordingly, it was seen that anti-glare characteristics were remarkably reduced.

Accordingly, it was seen that, depending on the content of the polysilazane, there was a significant difference in anti-glare and transmittance and a variable for maximizing the anti-glare and the transmittance was significantly affected by the content of the polysilazane (or viscosity depending on the content of the polysilazane), i.e., a composition ratio.

In particular, it was seen that, in Inventive Examples 1 and 7, a degree by which unevenness is formed was changed depending on a time of removing a solvent after the coating composition was sprayed and, in Inventive Example 7, haze and transmittance were very poor compared with Example 1.

The invention claimed is:

1. A method of manufacturing an anti-glare glass, the method comprising:
   S1) preparing a coating composition consisting of 2 to 20 wt. % of polysilazane having a weight average molecular weight equal to or less than 30,000 g/mol and a residual amount of a single solvent;
   S2) spraying and coating the coating composition onto a glass surface;
   S3) removing the solvent of the coating composition coated on the glass surface within 60 seconds to form an uneven layer on the glass surface, wherein the unevenness is caused by the polysilazane; and
   S4) performing heat treatment, wherein the anti-glare glass has haze of 1 to 5% and transmittance equal to or greater than 90%.

2. The method of claim 1, wherein the heat treatment of S4) comprises performing heat treatment at a temperature of 400 to 700° C.

3. The method of claim 2, wherein the heat treatment of S4) includes performing primary heat treatment at a temperature of 50 to 200° C. and, then, performing secondary heat treatment at a temperature of 400 to 700° C.

4. The method of claim 1, wherein the polysilazane satisfies the following Chemical Formula 1:

[Chemical Formula 1]

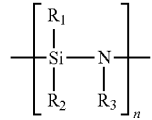

wherein $R_1$, $R_2$, and $R_3$ each independently comprise any one or two or more selected from hydrogen, an alkyl group, an alkenyl group, a cycloalkyl group, an aryl group, a group with a carbon group bonded directly to silicon, an alkylsilyl group, an alkylamino group, and an alkoxy group and n is an integer.

5. The method of claim 1, wherein the anti-glare glass has surface roughness of 1 to 20 nm.

6. The method of claim 1, wherein a mass of the coating composition coated per unit area of the glass in S2) is 5 to 15 g/m².

7. The method of claim 1, wherein the coating composition has a viscosity of 0.5 to 2.0 cp.

* * * * *